(12) United States Patent
St. Felix

(10) Patent No.: US 6,530,473 B1
(45) Date of Patent: Mar. 11, 2003

(54) AUTOMOBILE DISPOSABLE WIPES

(76) Inventor: Harold St. Felix, 5179 Pat Place, West Palm Beach, FL (US) 33407

( * ) Notice: Subject to any disclaimer, the term of this patent is extended or adjusted under 35 U.S.C. 154(b) by 0 days.

(21) Appl. No.: 09/709,151

(22) Filed: Aug. 6, 1998

(51) Int. Cl.$^7$ .............................................. B65D 71/00
(52) U.S. Cl. ...................... 206/233; 206/494; 206/812; 224/311
(58) Field of Search ................................. 206/210, 216, 206/225, 229, 233, 545, 549, 494, 812; 15/220.4; 224/277, 309, 311, 545, 547, 555, 901, 932; 220/476, 480, 481

(56) References Cited

U.S. PATENT DOCUMENTS

| 2,453,452 A | * | 11/1948 | Nielsen ...................... 15/220.4 |
| 3,664,064 A | | 5/1972 | Scheuer |
| 3,667,597 A | * | 6/1972 | Hollister ...................... 224/277 |
| 3,686,702 A | | 8/1972 | Jordan |
| 4,574,504 A | * | 3/1986 | Holmer ...................... 206/225 |
| 4,753,844 A | | 6/1988 | Jones et al. |
| 5,205,455 A | | 4/1993 | Moody |
| 5,231,728 A | * | 8/1993 | Schillinger ................... 15/220.4 |
| 5,595,786 A | * | 1/1997 | McBride et al. ............ 206/494 |
| 5,715,971 A | | 2/1998 | Morand |
| 5,992,718 A | * | 11/1999 | Zaranek ....................... 224/311 |
| 6,092,757 A | * | 7/2000 | Leytem ....................... 206/409 |
| 6,164,442 A | * | 12/2000 | Stravitz ....................... 206/233 |

* cited by examiner

Primary Examiner—Luan K. Bui
(74) Attorney, Agent, or Firm—Robert C. Kain; Fleit, Kain

(57) ABSTRACT

A container of nonflammable wipes or towels is attached in a safe and convenient place within the engine compartment of a motor vehicle. The wipes or towels are made from a disposable, nonflammable material. A container retaining the wipes is made from a high-temperature resistant material. The container provides access to the wipes via an opening in the container or by removal of a container lid or cover. The container may include insulation to prevent the interior of the container from reaching extreme engine compartment temperatures. The wipes are stored directly in the container or are stored in a removable canister. The removable canister is sized to fit within the container.

8 Claims, 2 Drawing Sheets

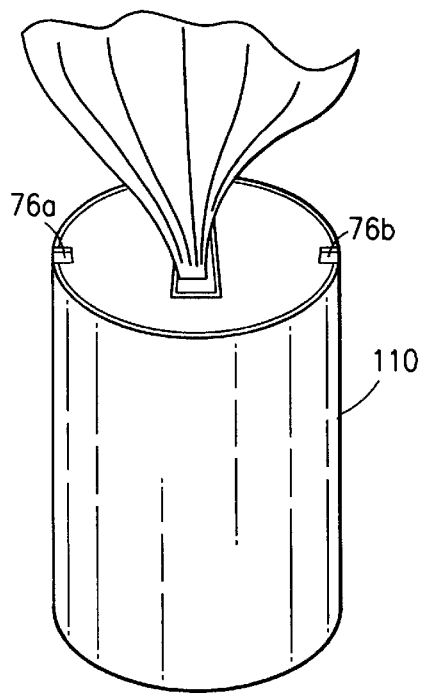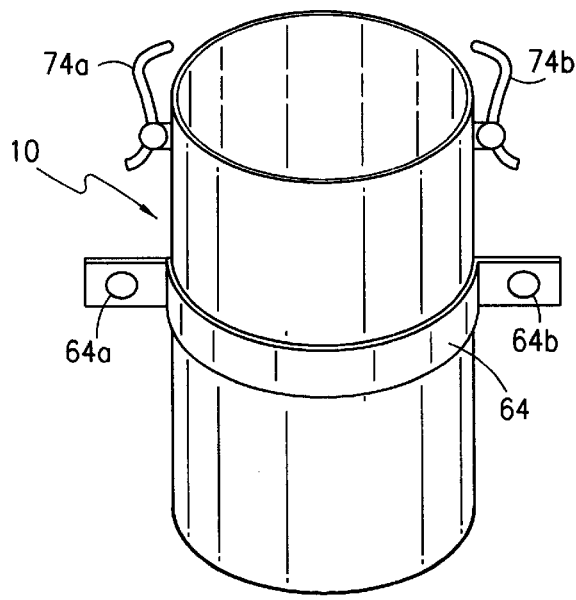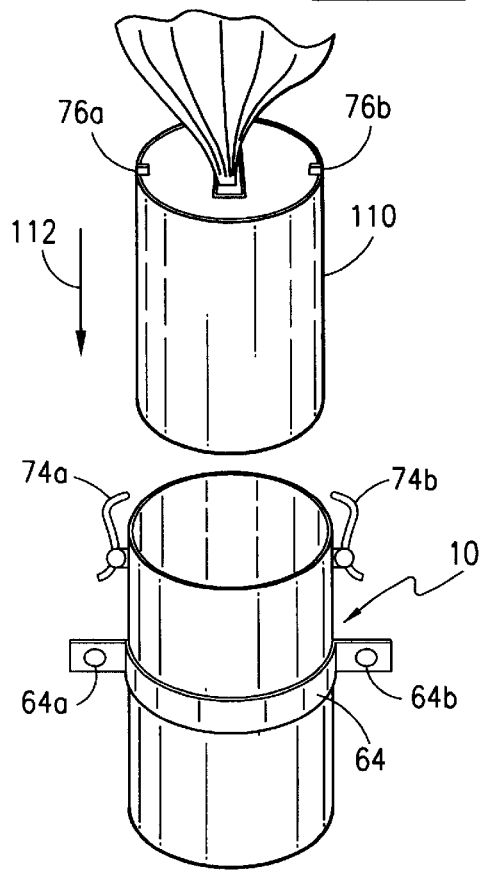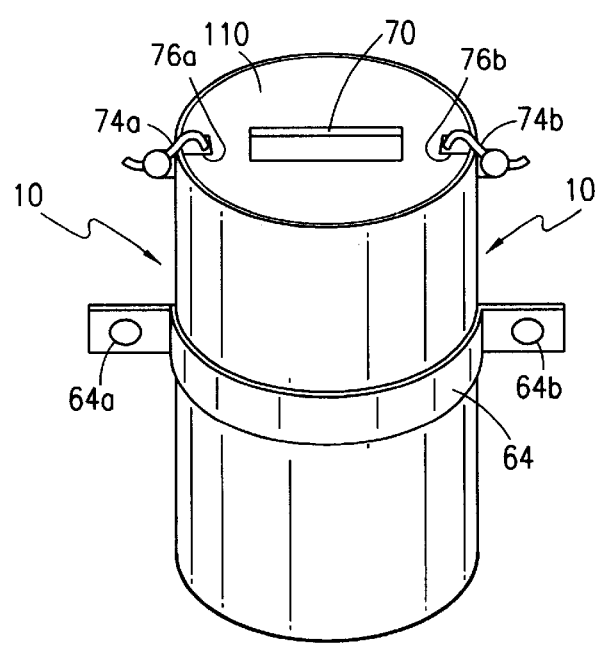

AUTOMOBILE DISPOSABLE WIPES

The present invention relates to providing a supply of wipes or disposable towels located within the engine compartment of a motor vehicle.

BACKGROUND OF THE INVENTION

The present invention provides a solution to an age-old predicament in which a person checking or inspecting a motor vehicle's working parts finds himself or herself without a means to wipe his or her hands, or to wipe clean a dirty surface or a measuring dipstick (e.g. an oil dipstick or transmission dipstick). The present invention provides clean, disposable, nonflammable wipes or towels in a location convenient to the person inspecting, diagnosing or repairing a motor vehicle's working parts.

U.S. Pat. No. 3,686,702 to Jordan discloses a dipstick wiper attachable under the hood of any car. The wiper consist of a cartridge casing in which the internal surface of the cartridge is covered with either an absorbent material such as felt or a non-absorbent material such as neoprene. The cartridge casing is shaped such that the fluid on a dipstick is wiped from the dipstick when the dipstick is passed through the cartridge casing.

U.S. Pat. No. 3,664,064 to Scheuer discloses a cleaning and polishing paper.

U.S. Pat. No. 4,753,844 to Jones, Gandhi, and Girgis, discloses a disposable, semi-moist wipe. The wipe is designed for one-step cleaning of mirrors and windows and for one-step interim cleaning of hard surfaces.

U.S. Pat. No. 5,205,455 to Moody discloses a dispenser with stabilizer for coreless roll products. The invention is to be used with a coreless roll of sheet material.

U.S. Pat. No. 5,715,971 to Morand discloses a paper towel dispenser of the type that dispenses toweling spirally from the center of a coreless roll of toweling while the roll stands upright.

OBJECTS OF THE INVENTION

It is an object of the present invention to provide a supply of disposable, nonflammable wipes or towels at or near the engine compartment of a motor vehicle to provide a person checking or inspecting the vehicle's working parts with a means to wipe clean a dirty surface or to wipe clean a measuring dipstick.

It is a further object of the present invention to provide a person checking or inspecting the vehicle's working parts with a means to wipe clean his or her hands.

SUMMARY OF THE INVENTION

A container of nonflammable wipes or towels is attached in a safe and convenient place within the engine compartment of a motor vehicle. The wipes or towels are made from a disposable, nonflammable material. A container containing the wipes is made from a high-temperature resistant material. The container provides access to the wipes via an opening in the container or by removal of a container lid or cover. The container may include insulation to prevent the interior of the container from reaching extreme engine compartment temperatures. The wipes are stored directly in the container or are stored in a removable canister. The removable canister is sized to fit within the container.

BRIEF DESCRIPTION OF THE DRAWINGS

Further objects and advantages of the present invention can be found in the detailed description of the preferred embodiments when taken in conjunction with the accompanying drawings in which:

FIG. 5 diagrammatically illustrate's a canister carrying the wipes;

FIG. 6 diagrammatically illustrates a vertical cylindrical embodiment of the wipe container;

FIG. 7 diagrammatically illustrates a vertical cylindrical embodiment of the container with a matching canister which carries or contains the wipes; and FIG. 8 diagrammatically illustrates a vertical cylindrical embodiment of the container holding a canister filled with wipes wherein the canister and container are locked together.

DETAILED DESCRIPTION OF THE PREFERRED EMBODIMENTS

Figure 1:
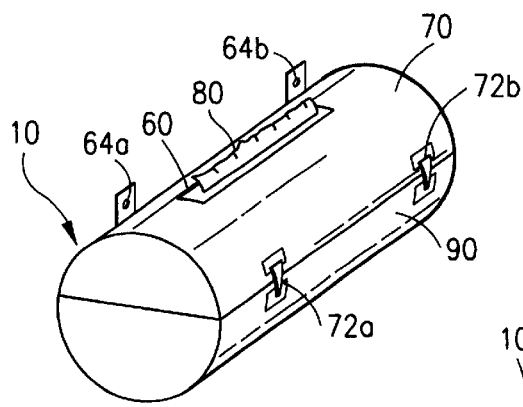
FIG. 1 diagrammatically illustrates one embodiment of the wipe supply container.

The present invention provides disposable, nonflammable wipes or towels stored in an engine compartment of a motor vehicle.

In FIGS. 1, 2A, 2B, 3, 4 and 6–8, the wipes or towels are stored in a container 10 (similar reference numerals designate similar items throughout the drawings). Container 10 is made of a temperature resistant material. The expression "temperature resistant material" means any material, such as a plastic or polymer material, a metallic material, or a combination thereof, which can withstand the temperature of the engine compartment of a motor vehicle without melting, deforming, igniting or otherwise burning. In the preferred embodiment, the wipe container is made of a plastic or polymer similar to plastic materials customarily utilized in an automobile engine compartment (e.g. fan shroud, fuse panels located in engine compartment, plastic housing used for air filter, or plastic container which holds windshield fluid).

Figure 2A:
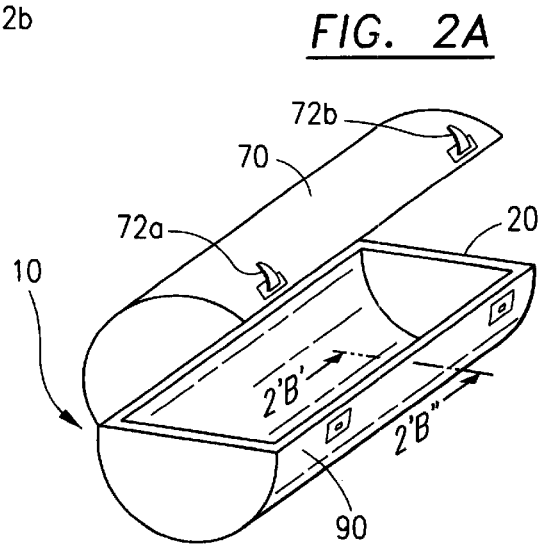
FIG. 2A diagrammatically illustrates the container in FIG. 1 empty and in a substantially open position.
Figure 2B:
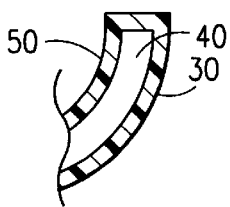
FIG. 2B is a partial cross-sectional view of the container illustrated in FIG. 2A from the perspective of section line 2B'–2B" in FIG. 2A.

FIG. 2A diagrammatically illustrates a container 10 with insulated walls 20. FIG. 2B is a partial cross-sectional view of container 10 from the perspective of section line 2B'–2B" in FIG. 2A. One embodiment of the invention includes an insulative layer 40 between the outer walls 30, 50 of the container 10. The container wall depicted in FIG. 2B includes an outer wall 30 and an inner wall 50. In FIG. 2B, the space 40 between the outer wall 30 and the inner wall 50 is a hollow space filled with air or other temperature insulative material or substance. The container can also be a single-walled structure with insulative material applied directly to the outer or inner wall surfaces. In another embodiment, container 10 does not include insulation.

Figure 3:
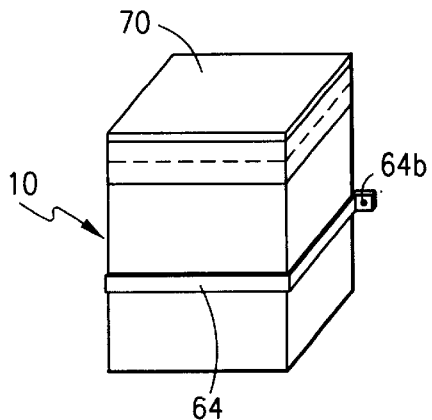
FIG. 3 diagrammatically illustrates another embodiment of the wipe container with a removable lid.

The wipe or towel container 10 can be configured in a variety of shapes. FIG. 1 illustrates a horizontal cylindrical shape. FIG. 3 illustrates a box shape. FIGS. 6, 7 and 8 illustrate a vertical cylindrical shape.

Container 10 diagrammatically illustrated in FIG. 1 includes a small opening 60 which provides access to the wipes 80. The supply or plurality of wipes can be replenished by unfastening latches 72a, 72b on container cover 70, opening container 10 (see FIG. 2A), and inserting a new supply of wipes. Container cover 70 is attached to the bottom half 90 of the container by hinges or a flexible material (not illustrated).

Figure 4:
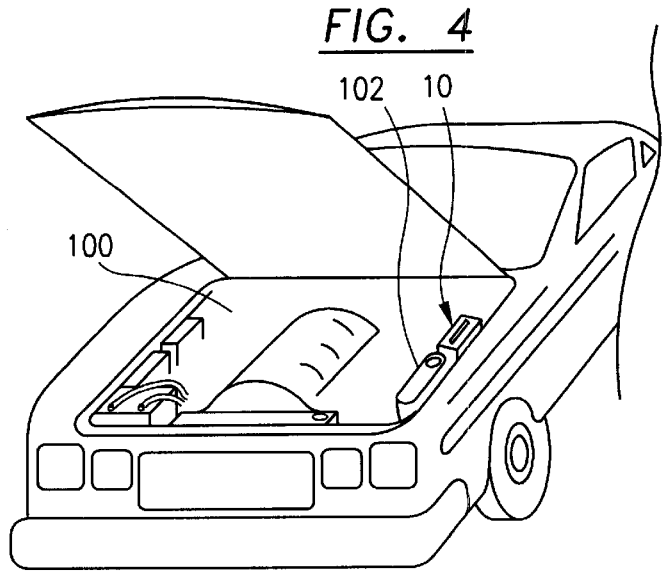
FIG. 4 diagrammatically illustrates a wipe container located within a motor vehicle's engine compartment.

Container 10 is placed in a safe, convenient location within the engine compartment 100 of a motor vehicle (see, e.g., FIG. 4). In FIG. 4, the container 10 is placed next to the windshield fluid container 102. Container 10 is fastened to other components in the engine compartment 100 (e.g. the interior frame, interior of the hood, etc.) by strap 64 (shown in FIGS. 3, 6, 7 and 8). Strap 64 may be attached to the requisite component in the engine compartment by using a conventional fastener at strap ends 64a, 64b (e.g. a screw, rivet, bolt and nut, nylon tie). FIG. 3 diagrammatically illustrates container 10 having a box shape. Container 10 includes a removable cover or lid 70. By using lid 70, the wipes or toweling contained within container 10 remain clean and free from the dust and dirt present in the engine compartment environment.

FIGS. 6, 7 and 8 diagrammatically illustrate a vertical cylindrical embodiment of wipe container 10. Container 10 includes latches 74a, 74b used to lock into place canister 110. Latches 74a, 74b cooperate with latch holders or recesses 76a, 76b on wipe retaining canister 110 (illustrated in FIGS. 5, 7 and 8). Other latch systems may be utilized to hold canister 110 in container 10. Canister 110, diagrammatically illustrated in FIGS. 5, 7 and 8, holds a plurality of wipes or towels 80. Canister 110 is sized to fit within container 10. The wipe supply is replenished by replacing the spent canister with a new canister. FIG. 7 diagrammatically illustrates canister 110 prior to insertion into container 10. Arrow 112 in FIG. 7 indicates the direction of insertion of canister 110 into container 10.

FIG. 8 diagrammatically illustrates the vertical cylindrical embodiment of container 10 with canister 110 loaded into container 10. Latches 74a, 74b are engaged with latch holders 76a, 76b, respectively, which as a latch system, hold canister 110 within container 10. Other latch systems may be utilized to capture and retain canister 110 in container 10. Container 10 illustrated in FIG. 8 also includes a removable cover 70 to protect the leading edge of the next wipe or towel from becoming soiled.

The wipes or towels 80 contained within container 10 can be arranged such that the removal of one wipe or towel from the container advances the next wipe or towel to a position substantially similar to the position of the removed wipe or towel prior to removal.

The claims appended hereto are meant to cover modifications and changes within the scope and spirit of the present invention.

What is claimed is:

1. A supply of wipes for the engine compartment of a motor vehicle, comprising:

a container having an interior space, said container and containment space defined by dual walls having an insulating space between the dual walls of said container;

a plurality of disposable nonflammable wipes disposed within in said interior space of said container; and a mount for said container, said mount adapted to attach said container to said engine compartment.

2. A supply of wipes as claimed in claim 1 wherein said container is temperature resistant.

3. A supply of wipes as claimed in claim 1 wherein the shape of said container is one of a vertically disposed cylindrical shape, a horizontally disposed cylindrical shape and a box shape.

4. A supply of wipes as claimed in claim 1 wherein said insulating space includes insulation providing thermal insulation to said interior space of said container from an ambient engine compartment environment.

5. A supply of wipes as claimed in claim 1 wherein said plurality of wipes are retained in a removable canister, and said canister with said plurality of wipes sized to fit within said container.

6. A supply of wipes as claimed in claim 5 wherein said container includes a latch and said canister includes a latch hold, said latch and said latch hold adapted to lock said canister onto said container.

7. A supply of wipes as claimed in claim 1 wherein said container defines an opening suitable for dispensing said wipes, and said container includes a removable cover adapted to cover said opening.

8. A supply of wipes as claimed in claim 1 wherein said container includes an exterior surface and a fastening strap, said fastening strap attached to said exterior surface of said container.

\* \* \* \* \*

UNITED STATES PATENT AND TRADEMARK OFFICE
CERTIFICATE OF CORRECTION

PATENT NO. : 6,530,473 B1  
DATED : March 11, 2003  
INVENTOR(S) : Harold St. Felix It is certified that error appears in the above-identified patent and that said Letters Patent is hereby corrected as shown below:

<u>Title page,</u>  
Item [22], Filed: change "Aug. 6, 1998" to -- November 10, 2000 --

Signed and Sealed this

Eleventh Day of November, 2003

JAMES E. ROGAN  
*Director of the United States Patent and Trademark Office*